(12) United States Patent
Yokoi

(10) Patent No.: US 8,270,088 B2
(45) Date of Patent: Sep. 18, 2012

(54) LASER COMBINING MECHANISM FOR USE IN A LASER SCANNING MICROSCOPE, AND A LASER SCANNING MICROSCOPE THAT USES IT

(75) Inventor: Eiji Yokoi, Tokyo (JP)

(73) Assignee: Olympus Corporation, Tokyo (JP)

( * ) Notice: Subject to any disclaimer, the term of this patent is extended or adjusted under 35 U.S.C. 154(b) by 654 days.

(21) Appl. No.: 12/200,855

(22) Filed: Aug. 28, 2008

(65) Prior Publication Data

US 2009/0073552 A1    Mar. 19, 2009

(30) Foreign Application Priority Data

Sep. 14, 2007   (JP) ................................. 2007-240127

(51) Int. Cl.
*G02B 27/14* (2006.01)
(52) U.S. Cl. ........................................ 359/637; 359/368
(58) Field of Classification Search .......................... None
See application file for complete search history.

(56) References Cited

U.S. PATENT DOCUMENTS

| | | | |
|---|---|---|---|
| 4,577,941 A | 3/1986 | Kubota | |
| 4,888,614 A | 12/1989 | Suzuki et al. | |
| 5,050,153 A | 9/1991 | Lee | |
| 5,638,142 A | 6/1997 | Kavanagh et al. | |
| 5,818,637 A * | 10/1998 | Hoover et al. | 359/381 |
| 6,975,400 B2 * | 12/2005 | Ortyn et al. | 356/419 |
| 2007/0053059 A1 * | 3/2007 | Gugel | 359/386 |

* cited by examiner

*Primary Examiner* — Derek S Chapel
(74) *Attorney, Agent, or Firm* — Arnold International; Bruce Y. Arnold

(57) ABSTRACT

A laser scanning microscope is disclosed that combines light from first and second scanning optical systems onto a common optical path using a beam combiner. A first plane-parallel transparent plate and a beam combiner are positioned on a support that may be moved relative to the common optical path. The first plane-parallel transparent plate has an optical thickness equal to the optical thickness of the beam combiner and is oriented with its surface normal lying substantially parallel with the surface normal of the beam combiner. An astigmatism-correcting optical element is provided on the common optical path, with the astigmatism-correcting optical element generating astigmatism that is equal in magnitude, but different in direction by 90 degrees, to the astigmatism generated by non-collimated light that is transmitted through the beam combiner. When the support is repositioned, spherical aberration in various light paths is maintained constant so that it may be easily corrected.

15 Claims, 10 Drawing Sheets

US 8,270,088 B2

LASER COMBINING MECHANISM FOR USE IN A LASER SCANNING MICROSCOPE, AND A LASER SCANNING MICROSCOPE THAT USES IT

This application claims the benefit of foreign priority under 35 U.S.C. §119 of JP 2007-240127 filed Sep. 14, 2007, the disclosure of which is hereby incorporated by reference.

BACKGROUND OF THE INVENTION

Confocal laser scanning microscopes perform better in resolution and contrast than conventional microscopes. In addition, unlike conventional microscopes, they provide resolution in the height direction of a sample. Therefore, confocal laser scanning microscopes are extensively used in, for example, the observation and measurement of biological samples and semiconductor samples. Confocal laser scanning fluorescent microscopes, which are a combination of a confocal laser scanning microscope and a fluorescent microscope, are used to observe the fluorescence of fluorescent substances in samples with the aid of a laser. Recently, confocal laser scanning fluorescent microscopes have been frequently used to illuminate a sample with multicolor (i.e., multi-wavelength) laser light and to observe multiple fluorescent substances that emit different wavelengths of fluorescence so that the multiple fluorescent substances may be separately detected.

In Japanese Laid-Open Patent Application No. H10-206742, a confocal scanning fluorescent microscope having independent scanning optical systems and lasers that emit laser light at different wavelengths (and are thus used for different purposes) are independently controlled so as to illuminate samples. With this technique, living cells can be observed while stimulating them with laser lights at different wavelengths. However, this technique has a problem in that aberrations occur when combining the light from lasers having different wavelengths, thereby deteriorating the imaging performance.

BRIEF SUMMARY OF THE INVENTION

The present invention relates to a laser scanning microscope, more particularly, to a confocal laser scanning fluorescent microscope that includes structure to correct for aberrations that would otherwise occur when combining light from plural lasers, with each laser usually having a monochromatic output at a different wavelength.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
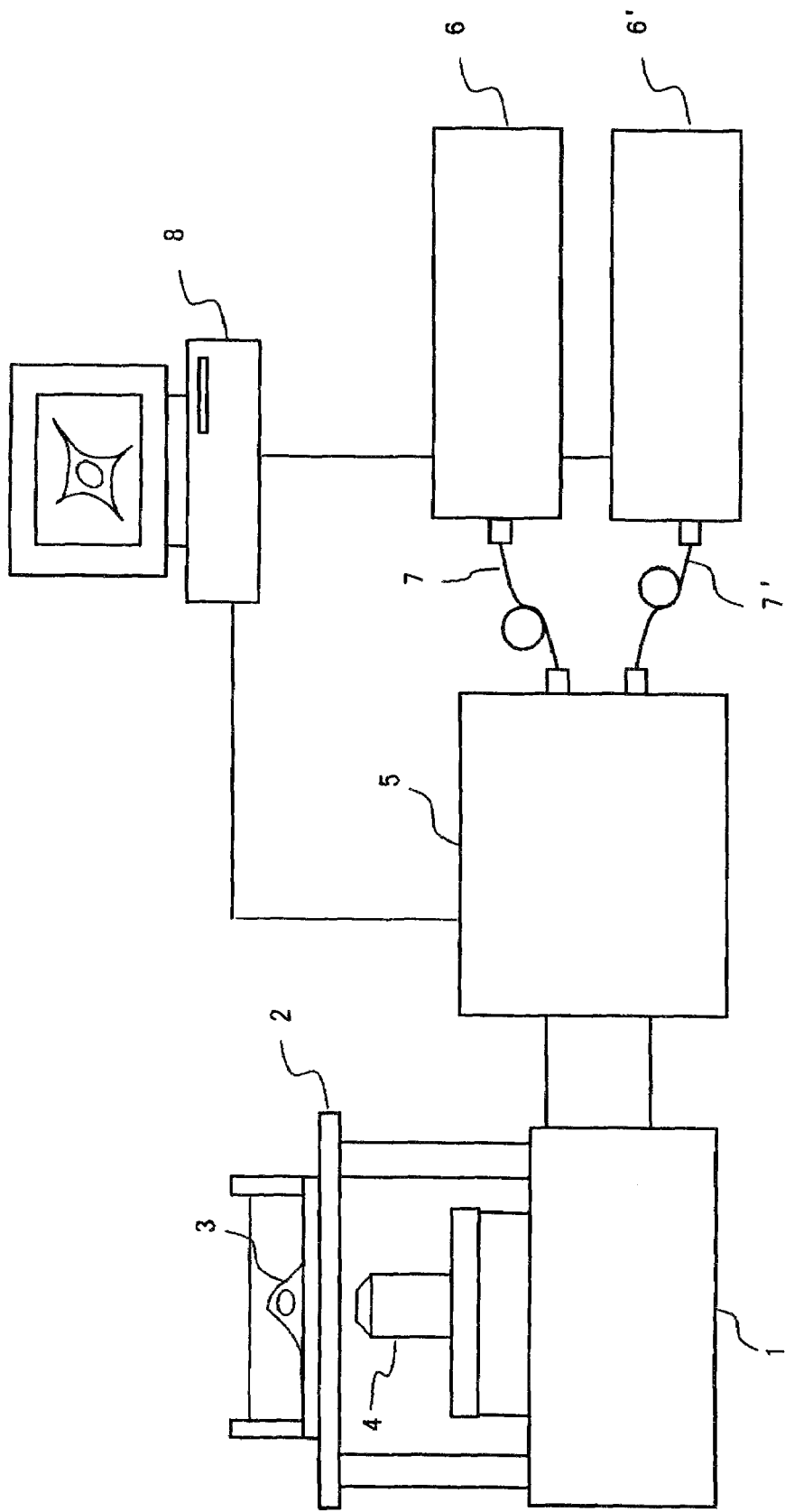
FIG. 1 is a diagram of a conventional laser scanning microscope having two independent laser scanning optical systems.

The present invention is directed to a laser combiner mechanism, for use in a laser scanning microscope, and a laser scanning microscope that uses it. The laser combining mechanism combines a first scanning optical system and a second scanning optical system onto a common optical path using one or more beam combiners. A single beam combiner may be oriented with its surface normal inclined at a non-zero angle relative to an optical axis along a common optical path, with the beam combiner positioned between a first pupil projection lens of a first scanning optical system and an imaging lens on the common optical path so as to transmit laser light from the first scanning optical system and to reflect laser light from the second scanning optical system. A first plane-parallel transparent plate having an optical thickness (i.e., the product of the actual thickness times the index of refraction) equal to that of the beam combiner is oriented with its surface normal substantially parallel to the surface normal of the beam combiner, and is positioned between the second pupil projection lens of the second scanning optical system and the beam combiner. An astigmatism correcting optical element, such as a second plane-parallel transparent plate that generates astigmatism equal in magnitude but different in direction by 90 degrees relative to the astigmatism generated by the beam combiner, is provided in the common optical path. The second plane-parallel transparent plate will correct the astigmatism of the light that passes through the beam combiner provided the following three conditions are satisfied:

(1) the optical thickness of the second plane-parallel transparent plate equals the optical thickness of the beam combiner;

(2) the angle between the surface normal of the second plane-parallel transparent plate and the optical axis of the combined beams immediately following the beam combiner is such that it is equal in magnitude to the angle between the surface normal of the beam combiner and the optical axis of the combined beams immediately following the beam combiner; and (3) the plane defined by the optical axis of the combined beams immediately following the beam combiner and the surface normal of the second plane-parallel transparent plate is perpendicular to the plane defined by the optical axis of the combined beams and the surface normal of the beam combiner.

The optical path between the first plane-parallel transparent plate and the beam combiner may be linear. Alternatively, the optical path between the first plane-parallel transparent plate and the beam combiner may be folded by a mirror, with the first plane-parallel transparent plate and the beam combiner being positioned in substantially the same plane.

It is desirable that both the first plane-parallel transparent plate and the beam combiner be mounted on a slidable support (such as a substrate), so that the first plane-parallel transparent plate may be placed between the first pupil projection lens and the imaging lens, and placed with the surface normals of the first plane-parallel transparent plate and the beam combiner being parallel and at a non-zero angle to the optical axis of light that transits the common optical path. With this structure, aberrations can remain unchanged when the optical path is switched.

Alternatively, the first plane-parallel transparent plate and the beam combiner may be mounted on a support that is rotatable, so that the first plane-parallel transparent plate may be placed between the first pupil projection lens and the imaging lens, and placed with its surface normal substantially parallel with the surface normal of the beam combiner and placed at a non-zero angle to the optical path. With this structure as well, aberrations can remain unchanged when the optical path is switched.

Further, it is desirable that the first plane-parallel transparent plate and the beam combiner be provided on one and the same filter wheel, but at opposite positions on the filter wheel. Moreover, use of a filter wheel allows for selective use of multiple beam combiners.

The astigmatism-correcting optical element may be formed of a second plane-parallel transparent plate that is provided between the beam combiner and the imaging lens on the common optical path, with the surface normal of the second plane-parallel transparent plate and the optical axis of light transiting the common optical path lying in a plane that is rotated 90 degrees from the plane containing the surface normal of the beam combiner and the optical axis of light transiting the common optical path. Alternatively, the astigmatism-correcting optical element may be a mirror that is provided subsequent to the imaging lens on the common optical path with its surface normal at a non-zero angle to the optical path so that the mirror folds the common optical path in a manner that causes the direction of the common optical path to become 180° opposite to the direction of the incident light that is reflected by the beam combiner onto the common optical path. Moreover, the astigmatism-correcting mirror may be provided in the optical path subsequent to the imaging lens, and the mirror surface may be convex or concave. If the mirror is convex, it should be oriented such that the light reflected by the mirror travels with its optical axis parallel, but in the opposite direction, to the optical axis of the light from the second pupil projection lens. If the mirror is concave, it should be oriented such that the light reflected by the mirror travels in a direction having a direction component that is normal to the plane defined by the optical axis of light from the first pupil projection lens and the optical axis of light from the second pupil projection lens.

The present invention provides a confocal laser scanning fluorescent microscope having a structure to combine beams from different laser sources, and at the same time is able to correct aberrations of the independent scanning optical systems that otherwise would be generated when the laser beams are combined.

FIG. 1 is a block diagram of the components of a conventional laser scanning microscope that may be used when implementing the present invention. In the figure, a microscope body 1 supports an objective lens 4 that is used to observe a sample 3 on a stage 2. A scan unit 5 is connected to the microscope body 1. Laser lights from laser units 6, 6' are introduced into the scan unit 5 via fiberoptic cables 7, 7', respectively.

Figure 2:
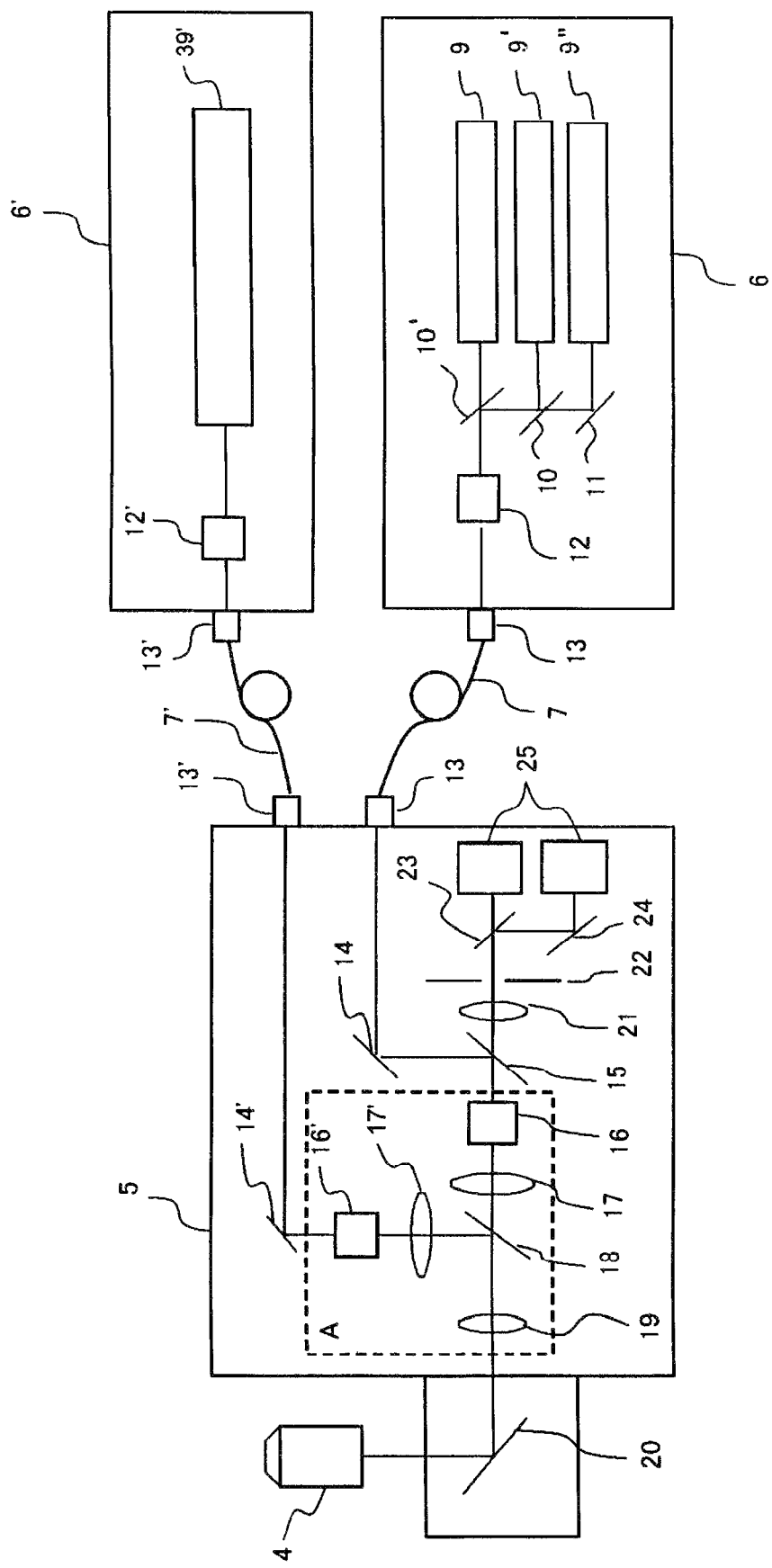
FIG. 2 is a diagram that illustrates the internal components of a conventional laser scanning microscope that uses two independent laser scanning optical systems, one of which employs three lasers.

As shown in FIG. 2, two independent laser scanners, namely, a first laser scanner 16 and a second laser scanner 16' may be provided in the scan unit 5. The reason the laser units 6, 6' are not themselves mounted within the scan unit 5 is that they are usually too large to fit.

As shown in FIG. 1, a computer terminal 8 is provided so as to control the scan unit 5, the laser units 6, 6', and to display the results.

In the case of FIG. 1, two independent laser units 6, 6' are shown connected to the scan unit 5 via the two fiberoptic cables 7, 7', respectively. However, at a given moment, the scan unit 5 can scan the light from only a selected one of these two laser units at a time. Alternatively, two independent scan units (not shown) could be used without causing any inconvenience in implementing the present invention.

FIG. 2 shows the internal components of a conventional laser scanning microscope. Part A in FIG. 2 (i.e., the components enclosed by a dashed line) is modified when implementing the present invention. Before describing the present invention, the prior art internal structure within part A will now be described.

A conventional laser scanning microscope uses multiple laser sources 9, 9' 9'' such as an argon ion laser ($\lambda$=488 nm), a He—Ne green laser ($\lambda$=543 nm), and a He—Ne laser ($\lambda$=633) that are positioned within an observation/excitation laser unit 6. Two dichroic mirrors 10, 10' and a mirror 11 are used to combine light from these different wavelength lasers onto a single optical path. The combined laser light is then adjusted in intensity by an AOTF (acousto-optic tunable filter) 12 and introduced into a scan unit 5 via a fiberoptic cable 7 and a coupling mechanism 13, 13. Similarly, a stimulation laser unit 6' includes a laser source 39' and an AOTF 12', and this laser light is separately introduced into the scan unit 5 via a fiberoptic cable 7' and a coupling mechanism 13', 13'.

The laser lights introduced from the observation/excitation laser unit 6 are combined onto a common detection optical path within the scan unit 5 using a beam combiner 15 and then guided to the first laser scanner 16. Then, this light is combined with the light from the stimulation laser unit 6' using a first pupil projection lens 17 and a beam combiner 18.

On the other hand, the laser light introduced from the stimulation laser unit 6' is scanned by the second laser scanner 16' and combined onto the observation optical path using a second pupil projection lens 17' and the beam combiner 18.

The observation/excitation laser light and the stimulation laser light that have been combined by the beam combiner 18 is collected by an imaging lens 19 and an objective lens 4 and is then incident onto a sample surface so as to excite fluorescent substances in the sample or to stimulate the sample. The first laser scanner 16 (that scans the observation/excitation beams) and the second laser scanner 16' (that scans the stimulation beam) operate independently; therefore, the stimulation light and observation/excitation light can independently scan the sample surface.

Fluorescence resulting from the laser illumination is collected by the objective lens 4 and guided to the detection optical path via the imaging lens 19, beam combiner 18, first pupil projection lens 17, first laser scanner 16, and beam combiner 15. The detection light is then directed to a confocal pinhole 22 by an imaging lens 21 so as to eliminate light that is not in the focal plane so as to obtain high resolution detection. The detection light passing through the confocal pinhole 22 is separated by a dichroic mirror 23 and detected by several detectors 25, 25.

The mirrors 11, 14, 14', 20, and 24 in FIG. 2 are used to fold the optical path. In the present invention, aberrations occurring in the beam combiner 18 (that combines the observation/excitation laser light and stimulation laser light) are corrected.

Figure 3:
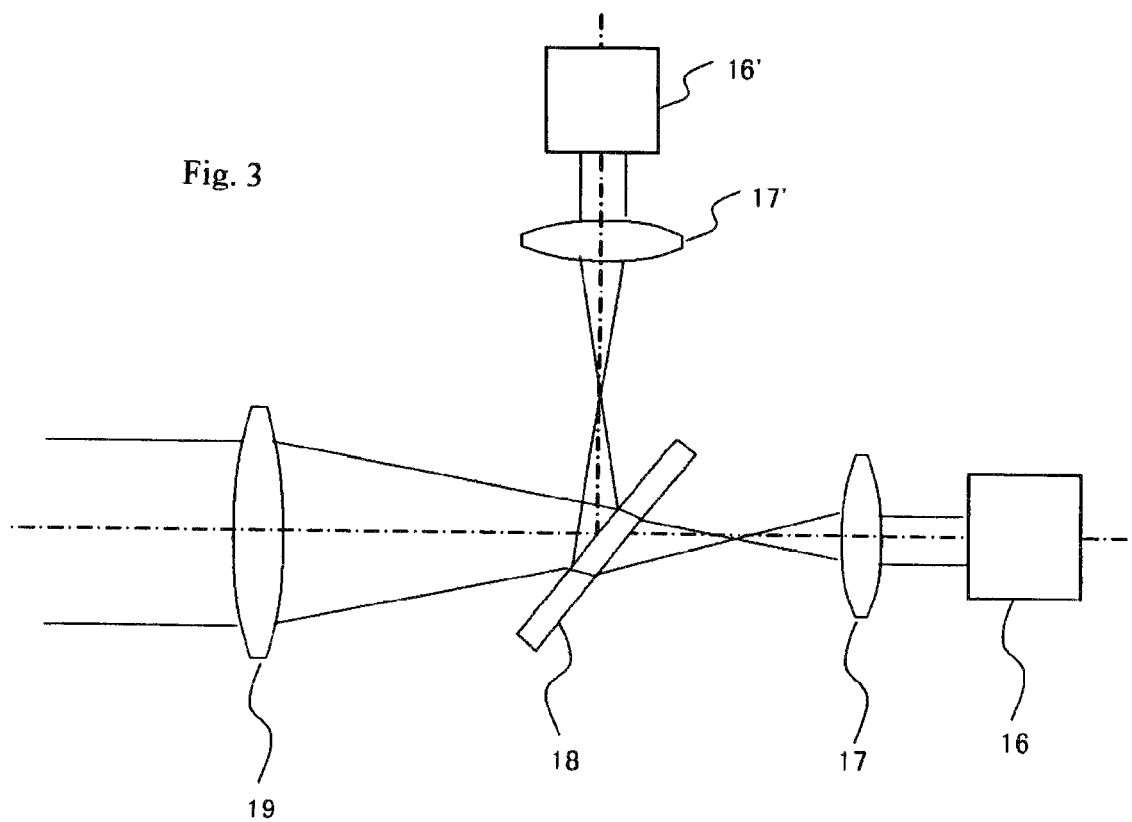
FIG. 3 illustrates how aberrations occur at a laser combiner mechanism.

FIG. 3 is an enlarged view of the beam combiner 18 shown in FIG. 2 and the components in its vicinity. The figure shows how light beams are emitted from the first laser scanner 16 and the second laser scanner 16', are condensed by the first pupil projection lens 17 and the second pupil projection lens 17', respectively, are combined at the beam combiner 18, and then are incident onto the imaging lens 19. As shown in the figure, the two (i.e., first and second) pupil projection lenses 17 and 17' receive collimated light and emit light that converges to a spot and then diverges. The beam combiner 18 is placed in the diverging light beams with its surface normal oriented at 45 degrees to the optical axis of both diverging beams. The beam combiner 18 has a specified thickness and is made of a material having a refractive index different from air. Therefore, the diverging light between the pupil projection lens 17 and the imaging lens 19 will not be symmetric about the optical axis, and thus aberrations are generated when this light passes through the beam combiner 18. These aberrations are primarily astigmatism and lateral color and they become evident at the image plane of the imaging lens 19. In order to correct these aberrations, the components within part A shown in FIG. 2 are modified in the present invention, as will now be described.

Several embodiments of the present invention will now be described with reference to the drawings.

Embodiment 1

Figure 4:
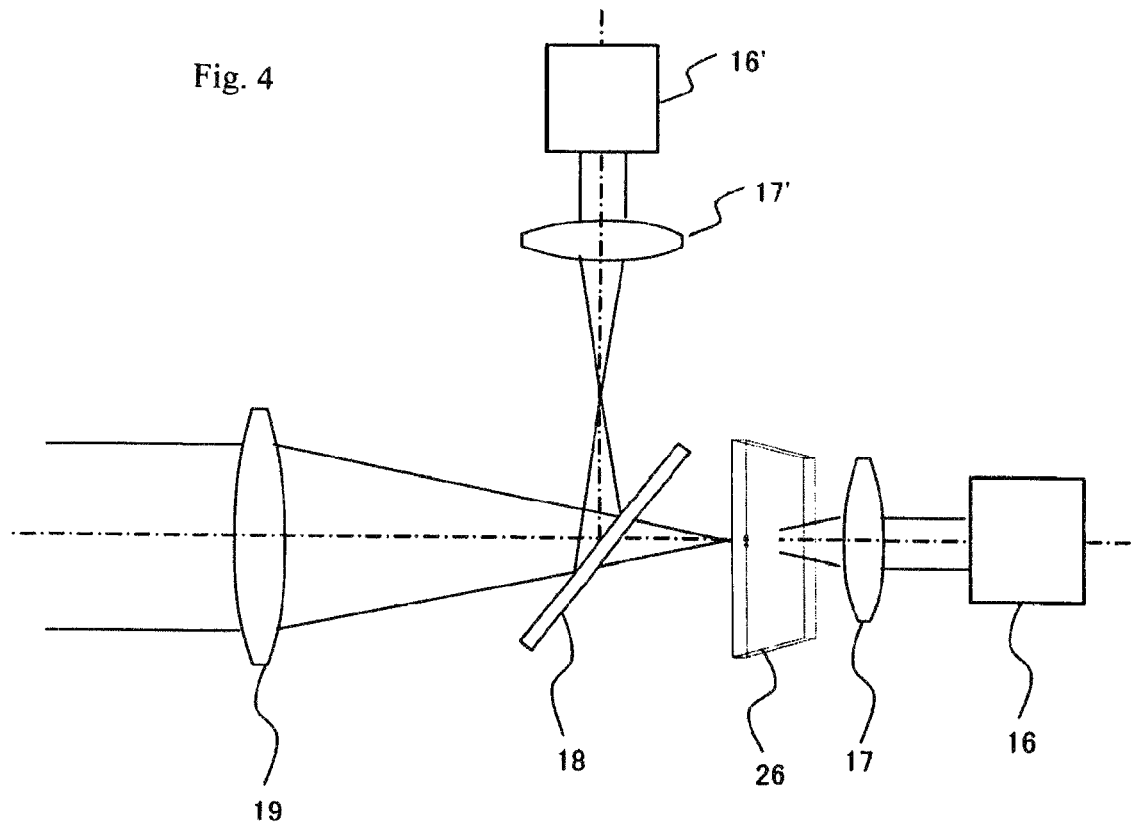
FIG. 4 shows the basic structure according to a first embodiment of a laser combiner mechanism used to correct aberrations of a laser scanning microscope that combines a first scanning optical system and a second scanning optical system onto a common optical path.

FIG. 4 illustrates the simplest embodiment of the present invention, namely, a laser combining mechanism used to correct aberrations of a laser scanning microscope that combines a first scanning optical system and a second scanning optical system onto a common optical path. In this embodiment, a plane-parallel transparent plate 26 having an optical thickness (i.e., the product of its index of refraction and its actual thickness) equal to the optical thickness of the beam combiner 18 is placed between the first pupil projection lens 17 and the beam combiner 18. The plane-parallel transparent plate 26 is placed with its surface normal oriented in such a manner that the astigmatism generated by light that passes through the beam combiner 18 and the astigmatism generated by the plane-parallel transparent plate 26 cancel one another.

The above structure compensates astigmatism as follows. Astigmatism occurs when meridional rays (such as rays in a vertical plane) and sagittal rays (such as rays in a horizontal plane) have different focal positions along the optical axis. When the plane-parallel transparent plate 26 is placed in a converging light flux at a non-zero angle, the ray components in the tilting direction and the ray components orthogonal thereto will have different focal positions along the optical axis. More specifically, the astigmatism generated by the plane-parallel transparent plate 26 will cancel the astigmatism generated by the beam combiner 18 provided:

(1) the optical thickness of the plane-parallel transparent plate 26 equals the optical thickness of the beam combiner 18;

(2) the angle between the surface normal of the plane-parallel transparent plate 26 and the optical axis of the optical path of the combined beams immediately following the beam combiner 18 is such that it is equal in magnitude to the angle between the surface normal of the beam combiner 18 and the optical axis of the combined beams immediately following the beam combiner; and (3) the plane defined by the optical axis of the combined beams and the surface normal of the plane-parallel transparent plate 26 is such that it is normal to the plane defined by the optical axis of the combined beams and the surface normal of the beam combiner 18.

As a result of using a plane-parallel transparent plate as described above to cancel the astigmatism generated by the beam combiner, spherical aberration will increase due to spherical aberration being generated by the plane-parallel transparent plate. In such a case, for example, the pupil projection lens 17 can be designed to compensate (ideally, to cancel) the spherical aberration generated by the plane-parallel transparent plate 26.

The beam combiner 18 and the plane-parallel transparent plate 26 may have different refractive indices. In such a case, the actual thickness of the plane-parallel transparent plate 26 is adjusted so that its optical thickness equals the optical thickness of the beam combiner 18.

Embodiment 2

Figure 5:
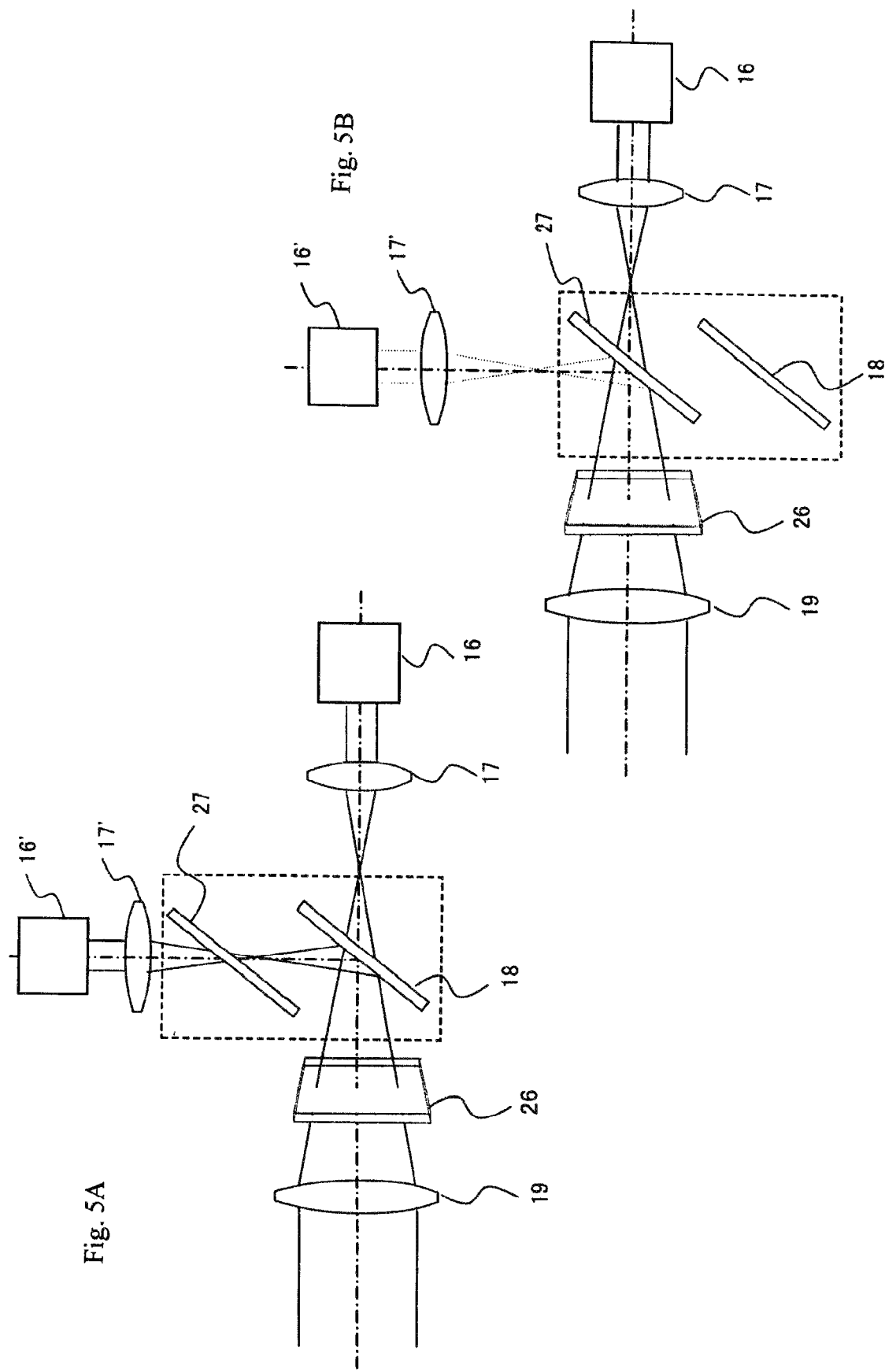
FIGS. 5A and 5B show basic structure according to a second embodiment of a laser combiner mechanism used to correct aberrations of a laser scanning microscope that combines a first scanning optical system and a second scanning optical system onto a common optical path, with the laser combiner mechanism being formed of two plane-parallel plates affixed at separated positions to a slidable support that is movable relative to the common optical path as shown in FIG. 5A and FIG. 5B, respectively.

FIGS. 5A and 5B show Embodiment 2 of a laser combining mechanism in which aberrations are properly corrected upon switching the position of two beam combiners that are mounted on a slidable support. By changing the position of the slidable support, the optical path is switched to the positions shown in these two figures, with the selected position of the slidable support depending on whether or not a stimulation laser light beam is being combined onto the common optical path. In the present embodiment, the astigmatism-correcting optical element that is placed in the common optical path is the plane-parallel transparent plate 26.

The plane-parallel transparent plate 26 has an optical thickness equal to that of the beam combiner 18 and is positioned between the beam combiner 18 and the imaging lens 19. In addition, a plane-parallel transparent plate 27 having an optical thickness equal to that of the beam combiner 18 is placed between pupil projection lens 17' and the beam combiner 18 with its surface normal substantially parallel to the surface normal of the beam combiner 18. Thus, both the surface normal of the beam combiner 18 and the surface normal of the plane-parallel transparent plate 27 lie within a first plane and each surface normal is aligned at a specified angle (e.g., 45° in FIGS. 5A and 5B) to the direction of the common optical path.

With the above arrangement, the observation/excitation laser light and the stimulation laser light are affected equally by being transmitted through plane-parallel transparent plates (namely, the beam combiner 18 and the plane-parallel transparent plate 27), and thus the generated astigmatism will be the same for each. Moreover, the generated astigmatism is corrected due to the plane-parallel transparent plate 26 having its surface normal at the same specified angle to the direction of the common optical path but lying in a plane that is orthogonal to the plane that contains the surface normals of the beam combiner 18 and the plane-parallel transparent plate 27.

With such a structure, both the observation/excitation laser light and the stimulation laser light are subject to lateral color aberration, but both of these are transmitted through plane-parallel transparent plates (namely, the beam combiner 18 and the plane-parallel transparent plate 27) of the same optical thickness and orientation relative to the incident light, and thus both the transmitted observation/excitation laser light and the stimulation laser light will have the same lateral color aberration. Because the observation/excitation laser light and stimulation laser light are both subject to the same spherical aberration and lateral color, it is easy to properly correct these aberrations using known techniques (such as designing other optical components to cancel these aberrations). The present embodiment provides a switching mechanism to prevent any change in the magnitude of these aberrations when the stimulation laser is not used. FIG. 5B shows a case in which the stimulation laser is not used. In FIGS. 5A and 5B, the beam combiner 18 and the plane-parallel transparent plate 27 are mounted on a common support that moves as a unit (e.g., by sliding) so that the plane-parallel transparent plate 27 is placed in the observation/excitation optical path. Here, the plane-parallel transparent plate 27 generates the same magnitude of astigmatism as generated by light that passes through the beam combiner 18, and thus the magnitude of astigmatism aberration is unchanged after the switching. In other words, (as shown in FIG. 5A), by switching the position of the common support, the plane-parallel transparent plate 27 generates astigmatism in the stimulation laser light from the second pupil projection lens 17' when the stimulation laser light is used to illuminate a sample and, as shown in FIG. 5B, it generates astigmatism in the observation/excitation laser light from the first pupil projection lens 17 when the stimulation laser light is not used.

The advantage of the above structure is that the plane-parallel transparent plate 27 plays different roles in the two states shown in FIGS. 5A and 5B, whereby components and spaces are effectively used.

Embodiment 3

Figure 6:
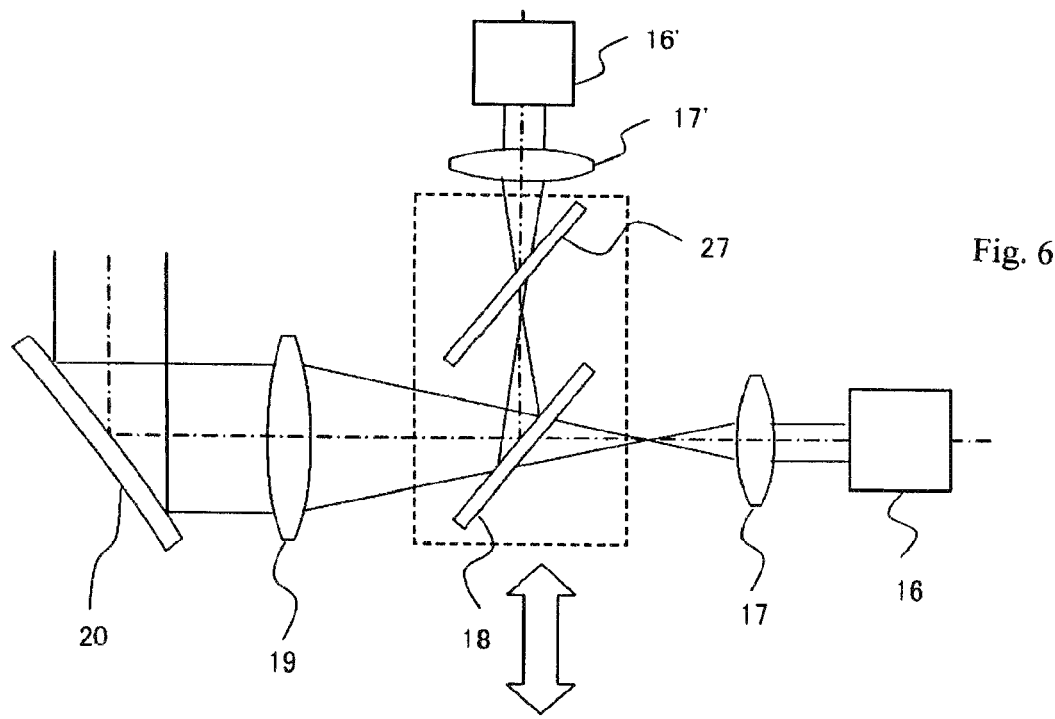
FIG. 6 shows the basic structure according to a third embodiment of a laser combiner mechanism according to the present invention, which is similar in structure to that of the second embodiment except that, in addition, a mirror 20 is also used in the common optical path so as to correct aberrations.

FIG. 6 is an illustration for explaining a modified embodiment of Embodiment 2. In Embodiment 3, the astigmatism-correcting optical element used in implementing the present invention is a mirror that is curved to be convex.

There are other ways to generate astigmatism than by passing light through an inclined, plane-parallel transparent plate that is placed in an optical path where light is converging or diverging. For example, astigmatism also occurs when a mirror having optical power as a result of its surface being curved is placed so as to fold an optical path. Thus, the plane-parallel transparent plate 26 in Embodiment 2 may be replaced with a curved mirror so as to purposely generate astigmatism. A planar mirror can be made to become curved by adjusting the thickness of a coating layer on the mirror. This is possible due to the mirror substrate and the coating layer on the mirror surface having different thermal expansion coefficients. Moreover, the curvature of a formerly planar mirror can be adjusted by controlling the coating layer thickness.

A curved mirror generates astigmatism as follows. When a curved mirror reflects collimated light that is incident normal to its surface, the reflected light will be affected by the refractive power of the curved mirror, will travel in a direction 180° to the incident light, and will have focal positions on the optical axis in the meridional and sagittal image planes that coincide. However, when the curved mirror is tilted relative to the optical axis so as to fold the optical path, the refracting power of the curved mirror will vary for rays in the sagittal versus the meridional image planes, resulting in astigmatism.

In the present embodiment, a convex mirror 20 (see FIG. 2) is placed in the optical path subsequent to the imaging lens in lieu of using the plane-parallel transparent plate 26 as in Embodiment 2. The convex mirror 20 is tilted in a manner so as to direct the beam reflected by the mirror 20 in a direction that is 180 degrees (i.e., opposite) to the direction of travel of the incident light that is reflected by the beam combiner 18 onto the common optical path. The other components (including the plane-parallel transparent plate 27) are the same as in Embodiment 2, and thus further explanation of those components will be omitted.

The present embodiment also has efficacy in that the beam combiner 18 and the plane-parallel transparent plate 27 are mounted to a common support that slides to two different positions. Providing the two different positions of the plane-parallel transparent plate 27 allows the plane-parallel transparent plate to play different roles, and switching the position of the plane-parallel transparent plate prevents changes in the magnitude of aberrations when the stimulation laser is not used. Furthermore, with such a structure, the same magnitude of lateral color aberration is generated in each of the two optical paths.

Embodiment 4

Figure 7:
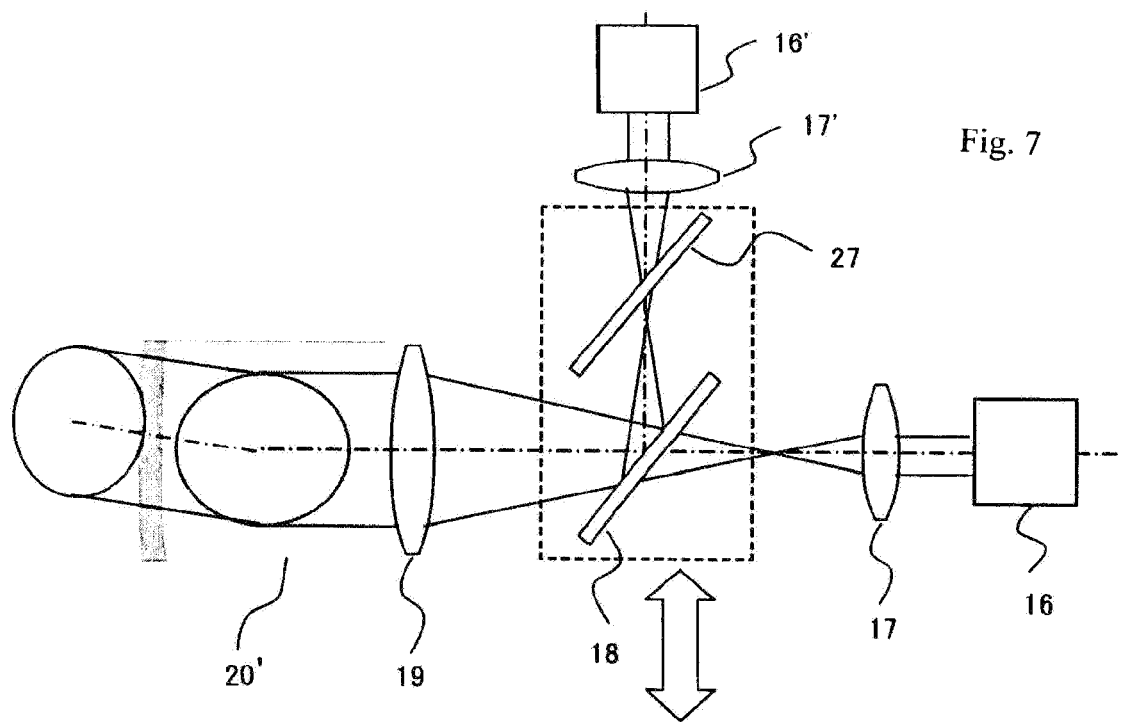
FIG. 7 shows the basic structure according to a fourth embodiment of a laser combiner mechanism according to the present invention, which is similar in structure to that of the third embodiment except that the orientation of the mirror 20' is different than in the third embodiment.

FIG. 7 is an illustration for explaining another possible modification to that of Embodiment 2. FIG. 7 shows the basic structure according to a fourth embodiment of a laser combiner mechanism according to the present invention, which is similar in structure to that of the third embodiment except that the orientation of the mirror 20 is changed.

In the present embodiment, the astigmatism-correcting optical element is a mirror that is curved so as to be concave rather than convex. More specifically, a mirror 20' is placed in the optical path subsequent to the imaging lens 19. The mirror 20' replaces the plane-parallel transparent plate 26 in Embodiment 2. The concave mirror 20' is oriented such that the light reflected by the concave mirror 20' travels in a direction having a direction component that is normal to the plane defined by the optical axis of light from the first pupil projection lens and the optical axis of light from the second pupil projection lens. This structure yields the same efficacy as that of Embodiment 3.

Embodiment 5

Figure 8:
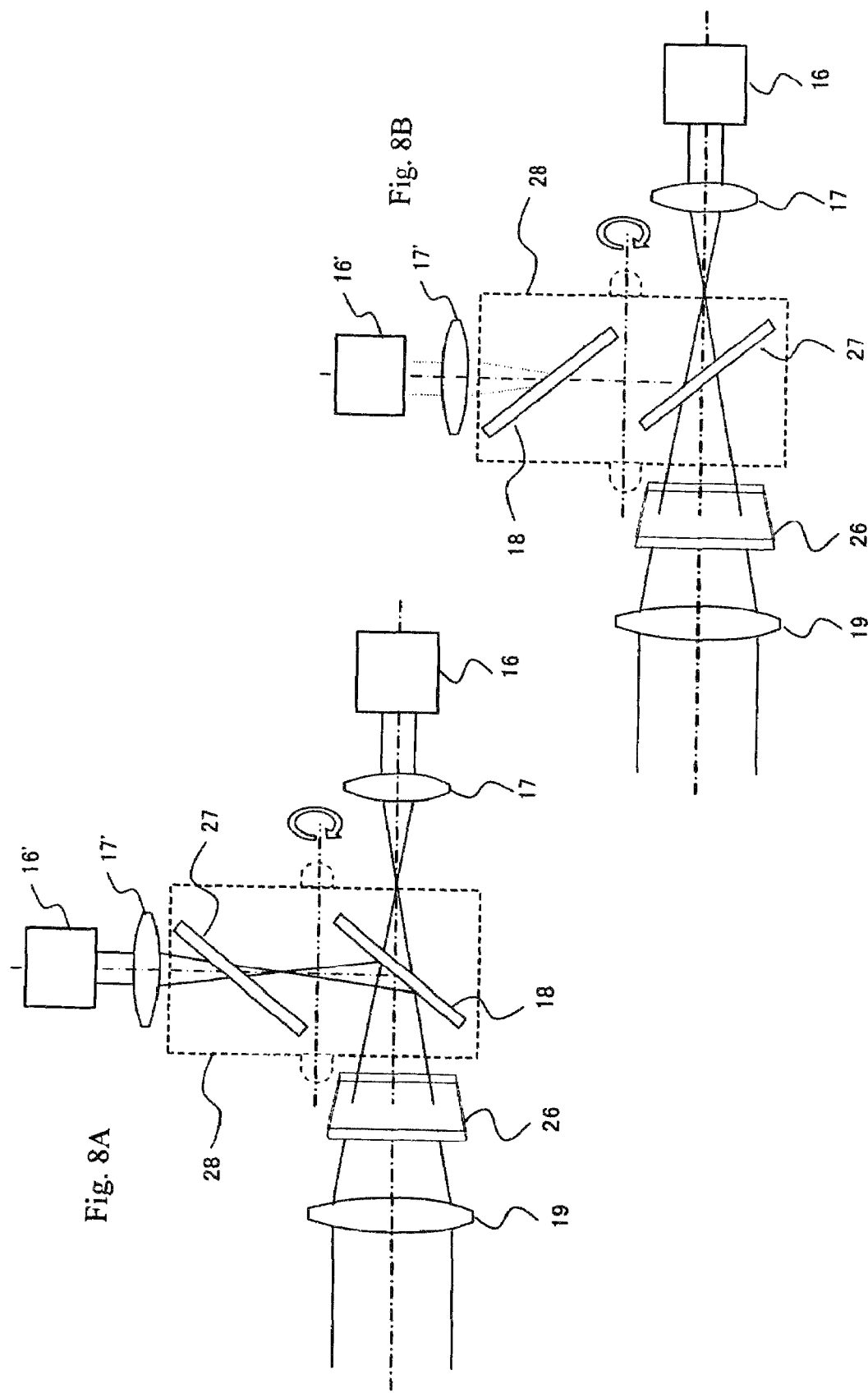
FIGS. 8A and 8B show the basic structure according to a fifth embodiment of a laser combiner mechanism according to the present invention, with FIG. 8A illustrating one side of a rotatable support and FIG. 8B illustrating the opposite side of the rotatable support. In this embodiment, instead of using a slidable support on which a beam combiner and a parallel-surface transparent plate (hereinafter termed a plane-parallel transparent plate) are mounted, a rotatable support is utilized with a beam combiner and a plane-parallel transparent plate mounted to each opposite side of the rotatable support with different orientations, so as to switch the orientation of the mounted components by rotating the rotatable support.

FIGS. 8A and 8B show the basic structure of a laser combiner mechanism according to Embodiment 5. In this embodiment, instead of using a slidable support on which a pair of beam combiners are mounted, a pair of beam combiners are mounted to each opposite side of a rotatable support so as to switch the orientation of the beam combiners by rotating the rotatable support, as illustrated in FIGS. 8A and 8B. The arrangement of the stimulation laser shown in FIG. 8A is the same as that of the stimulation laser shown in FIG. 5A for Embodiment 2. In this embodiment, as shown in FIG. 8A, a plane-parallel transparent plate 26 having an optical thickness equal to that of the beam combiner 18 is placed between the beam combiner 18 and the imaging lens 19 with its surface normal at an appropriate non-zero angle to the optical axis of the beam transmitting through the beam combiner. As previously discussed with respect to Embodiment 1, the plane defined by the optical axis of the combined beams and the surface normal of the plane-parallel transparent plate 26 is such that it is normal to the plane defined by the optical axis of the combined beams and the surface normal of the beam combiner 18. In addition, a plane-parallel transparent plate 27 having an optical thickness equal to that of the beam combiner 18 is placed between the beam combiner 18 and pupil projection lens 17' with the surface normals of the plane-parallel transparent plate 27 and the beam combiner 18 being parallel.

In the present embodiment, instead of the beam combiner 18 and the plane-parallel transparent plate 27 being mounted on a slidable support, pairs of a beam combiner 18 and a plane-parallel transparent plate 27 are mounted on opposite sides of a rotatable support so that the rotatable support may be rotated to the two positions shown in FIGS. 8A and 8B. On each side of the rotatable support a beam combiner 18 and a plane-parallel transparent plate 27 (each identical in structure, but not in function) are mounted so as to have their surface normals parallel and at a prescribed angle (e.g., 45 degrees) to the direction of the combined optical path. However, the beam combiner 18 and the plane-parallel transparent plate 27 on one side of the rotatable support have their surface normals positioned orthogonal to the surface normals of the beam combiner 18 and the plane-parallel transparent plate 27 that are mounted to the opposite side of the rotatable support.

Therefore, by rotating the rotatable support to the position shown in FIG. 8A and then to the position shown in FIG. 8B, not only are the relative positions of the beam combiner 18 and the plane-parallel transparent plate 27 switched, but also their inclinations are switched by 90 degrees. However, astigmatism occurs in the same manner for both positions (i.e., when the rotatable support is rotated by 180 degrees). Thus, the present embodiment provides a switching of components that prevents any change in the magnitude of aberrations when the stimulation laser is not used. Moreover, the same magnitude of lateral color is generated in each optical path.

Figure 9:
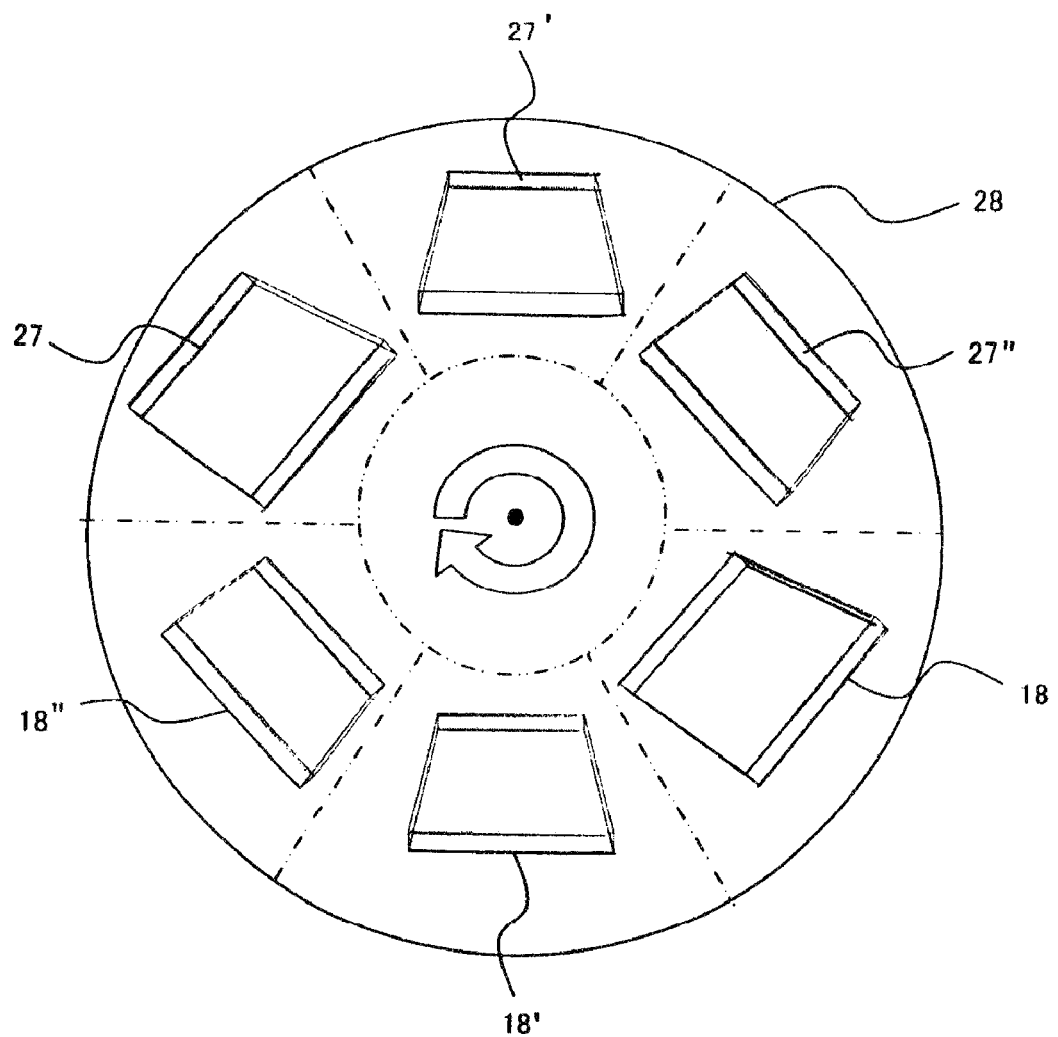
FIG. 9 is an illustration of a filter wheel that may be used in conjunction with the fifth embodiment of the laser combiner mechanism shown in FIGS. 8A and 8B.

The present embodiment can be further modified to allow multiple pairs of beam combiners and transparent plates to be selectively exchanged. For example, as shown in FIG. 9, a filter wheel 28 having multiple beam combiners 18, 18' 18" and multiple plane-parallel transparent plates 27, 27', 27" arranged in pairs at opposite positions on the filter wheel 28 can be used to provide a selection of multiple sets of beam combiners 18 and plane-parallel transparent plates 27.

Embodiment 6

Figure 10:
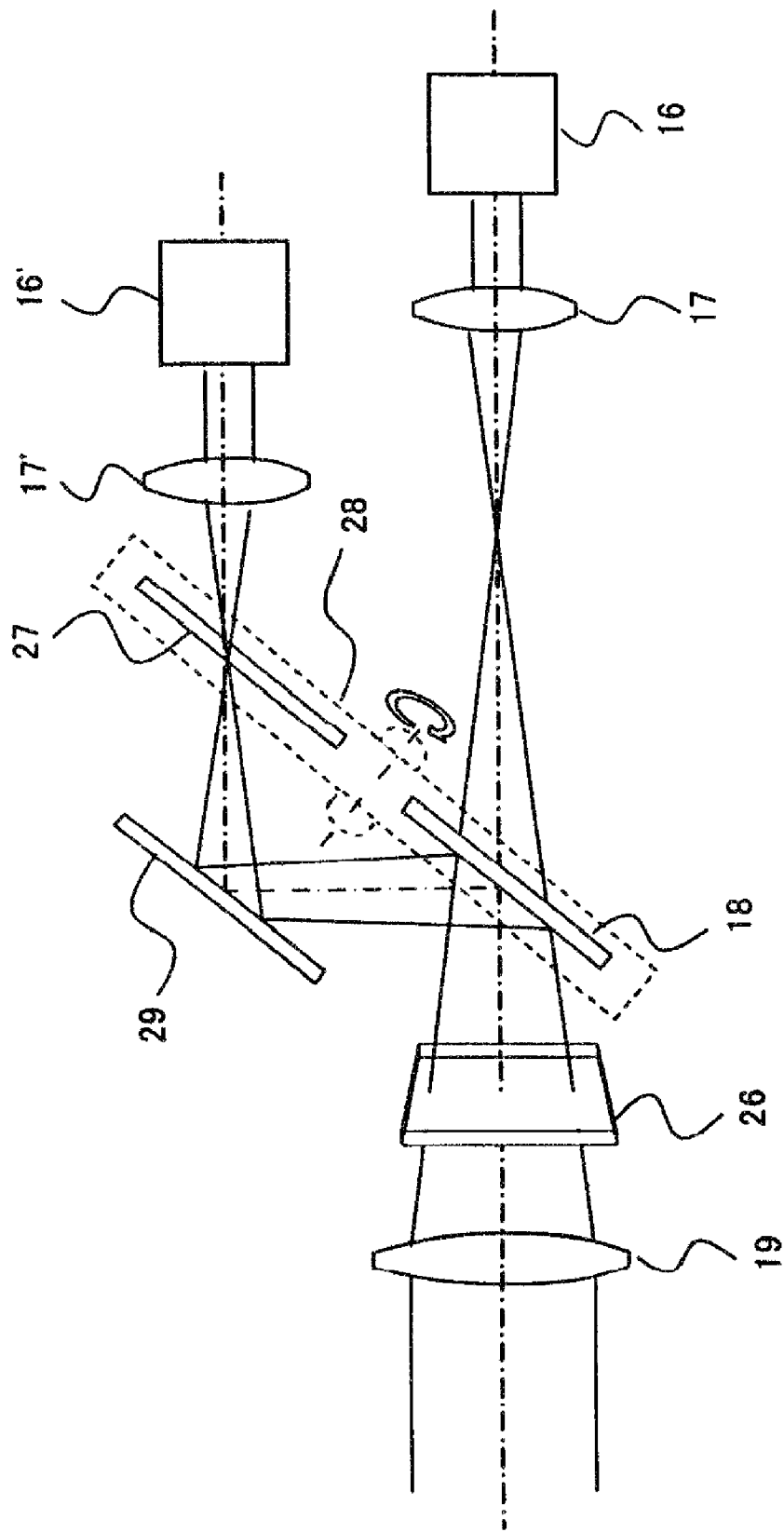
FIG. 10 shows the basic structure according to a sixth embodiment of a laser combiner mechanism according to the present invention, wherein a dichroic mirror (formed of a plane-parallel plate) and a plane-parallel transparent plate are affixed to a support at separated positions and these may be rotated into the light paths, as indicated in the figure.

FIG. 10 shows another structure in which dichroic mirrors are exchangeable. FIG. 10 shows the basic structure according to a sixth embodiment of a laser combiner mechanism according to the present invention. In this embodiment, a dichroic mirror (formed of a plane-parallel plate) and a plane-parallel transparent plate are affixed to a support at separated positions and these may be rotated into the light paths, as indicated in the figure.

In the present embodiment, the observation/excitation laser and stimulation laser are mounted with their output laser beams parallel rather than perpendicular. These output laser beams, after passing through the first laser scanner 16 and the second laser scanner 16', pass through the dichroic mirror 18 and the plane-parallel transparent plate 27, respectively. When the dichroic mirror 18 and the plane-parallel transparent plate 27 are placed in the respective optical paths at the same angle, they generate the same magnitude of aberration. This means that the dichroic mirror 18 and the plane-parallel transparent plate 27 must have their respective surface normals be parallel. In such a case, it is preferable that the dichroic mirror 18 and the plane-parallel transparent plate 27 lie in substantially the same plane. With such a structure, the stimulation laser light passing through the plane-parallel transparent plate 27 is reflected by a mirror 29 and enters the dichroic mirror 18, where the stimulation laser light is combined with the observation laser light.

As in Embodiment 2, a tilted plane-parallel transparent plate 26 having a thickness optically equal to that of the beam combiner 18 and the plane-parallel transparent plate 27 is placed in the combined optical path following the beam combiner in order to cancel the astigmatism in the combined light generated by the light that transits through the plane-parallel transparent plate 27 as well as by the light that transits through the beam combiner 18.

In the present embodiment, the beam combiner 18 and the plane-parallel transparent plate 27 may be rotated about a rotation axis as indicated by the circular arrow in FIG. 10 so as to switch their positions. Also with this structure, as in the other embodiments, the plane-parallel transparent plate 27 generates the same magnitude of astigmatism as the beam combiner 18. Thus, the laser light from the first laser scanner 16 and the second laser scanner 16' will have the same magnitude aberration when used to illuminate a sample. When a stimulation laser is not used, by rotating the positions of the beam combiner 18 and the plane-parallel transparent plate 27, any change in aberration magnitude is prevented since the same magnitude of lateral color aberration will occur as when a stimulation laser is used.

Figure 11:
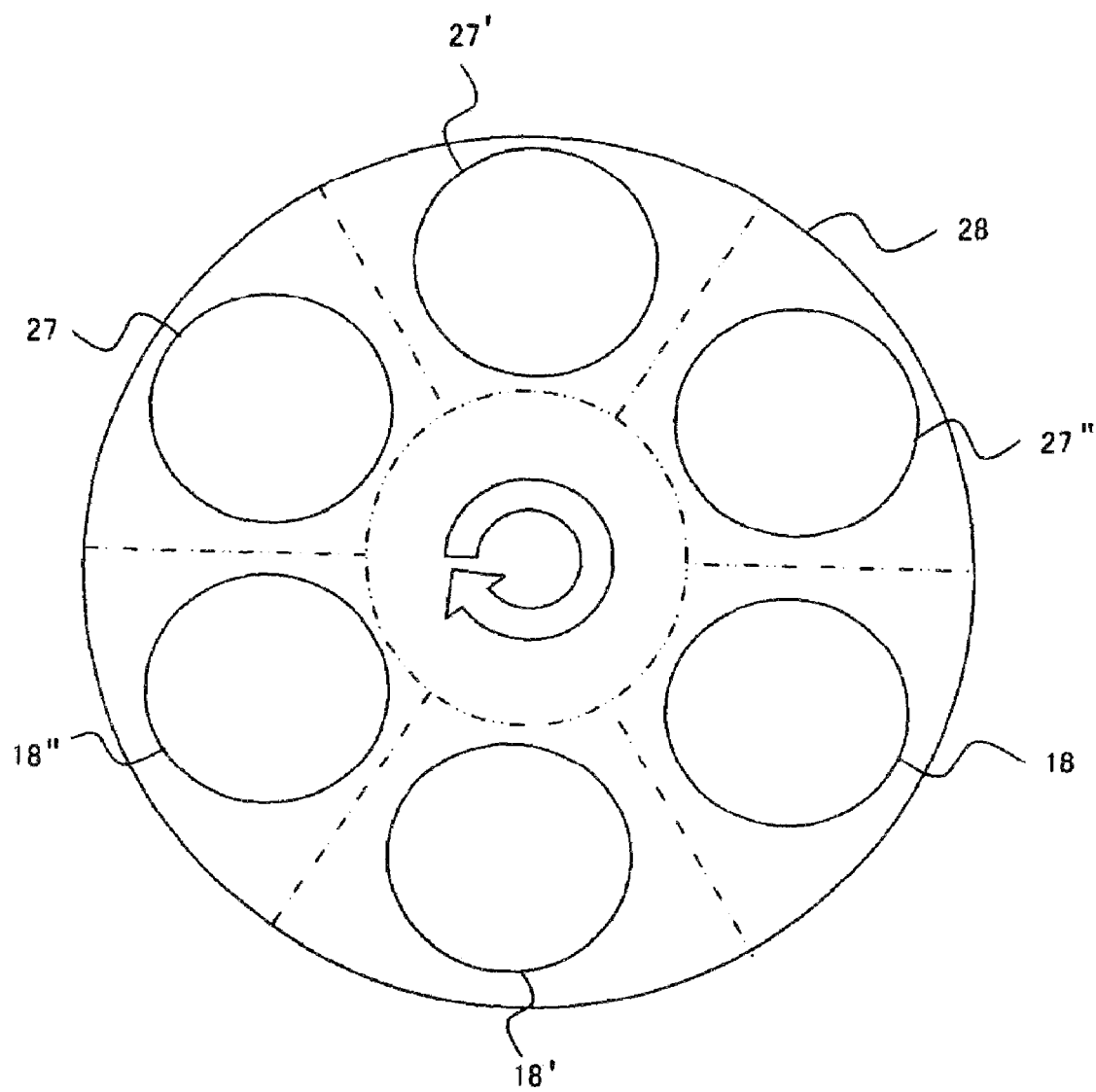
FIG. 11 is an illustration of a filter wheel that may be used with the sixth embodiment shown in FIG. 10.

Also in the present embodiment, multiple beam combiners 18 may selectively be exchanged. For example, as shown in FIG. 11, a filter wheel 28 having the beam combiners 18, 18', 18" and the plane-parallel transparent plates 27, 27' and 27" in opposite positions may be used to realize the selection of a particular pair of beam combiner 18, 18' 18" and (astigmatism-correcting) plane-parallel transparent plates 27, 27' 27".

Embodiment 7

Figure 12:
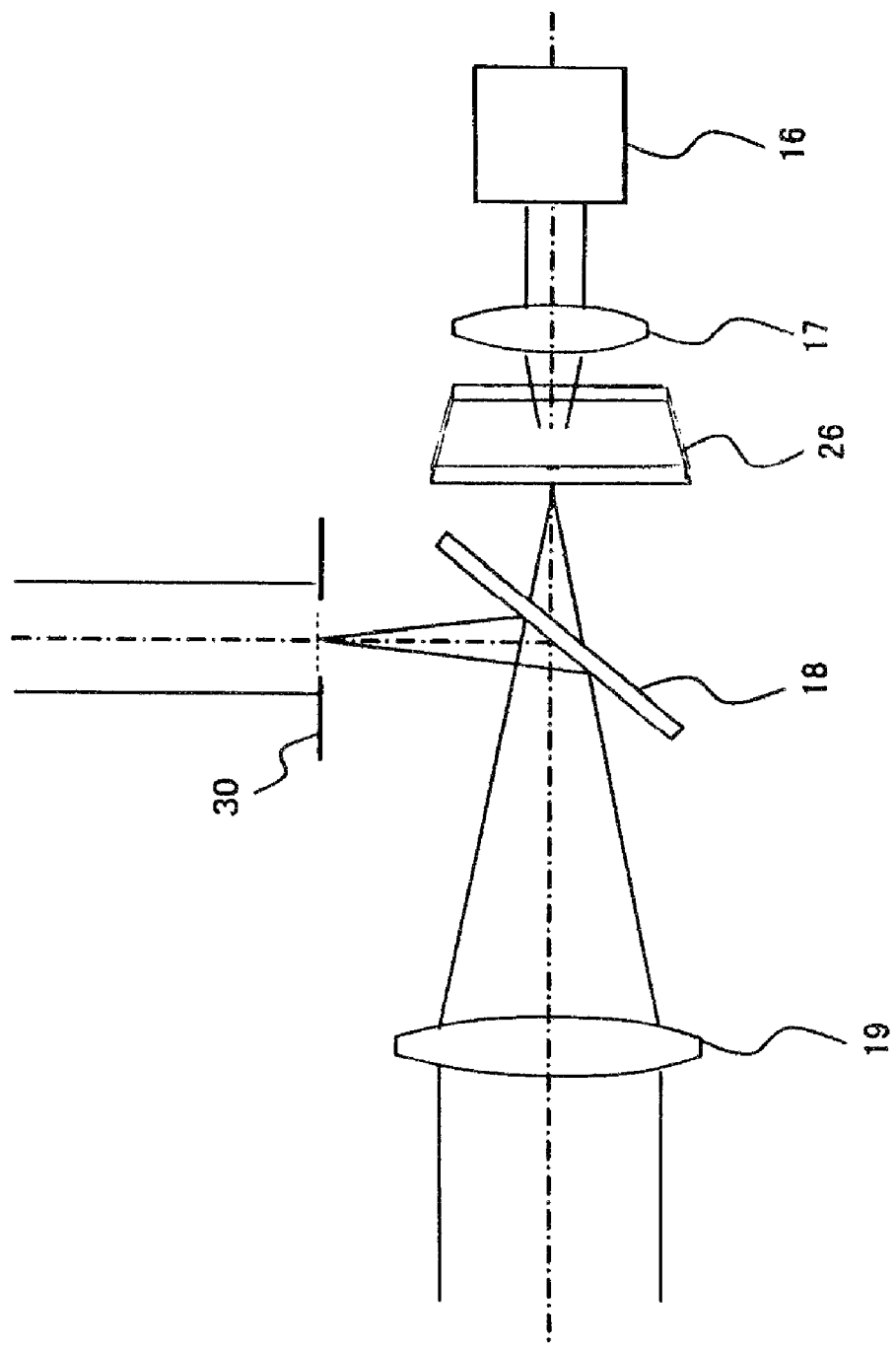
FIG. 12 is an illustration of the optical components that form a non-scanning, stimulation optical path.

FIG. 12 shows an exemplary structure in which the stimulation optical path is a non-scanning optical system. It is preferable in some cases that the stimulation light illumination not be scanned. The present invention can properly be applied to such cases. In the exemplary structure shown in FIG. 12, a plane-parallel transparent plate 26 having an optical thickness equal to that of the beam combiner 18 is placed between the beam combiner 18 and the pupil projection lens 17. As discussed previously for other embodiments, the surface normal of the plane-parallel transparent plate 26 is oriented in space to cancel the astigmatism generated by the diverging light that transits through the beam combiner 18. More specifically, the surface normal is at an appropriate angle to the optical axis of the beam transmitting through the beam combiner, and the plane defined by the optical axis of the combined beams and the surface normal of the plane-parallel transparent plate 26 is such that it is normal to the plane defined by the optical axis of the combined beams and the surface normal of the beam combiner 18. In addition, a diaphragm 30 is placed at the front focal position of the imaging lens 19 in the stimulation optical path, and the stimulation light illuminates the diaphragm. With this structure, because the diaphragm is at a conjugate position of the imaging lens 19 relative to the specimen surface, the stimulation light illumination range can be determined by appropriately adjusting or changing the diaphragm 30.

With this structure, astigmatism generated by the dichroic mirror 18 and astigmatism generated by the plane-parallel transparent plate 26 compensate one another and the same efficacy as obtained in Embodiment 1 is achieved.

The invention being thus described, it will be obvious that the same may be varied in many ways. For example, a diaphragm (as discussed above with regard to Embodiment 7) may also be used in Embodiments 2-6. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A laser combining mechanism, for use in a laser scanning microscope, which combines a first scanning optical system and a second scanning optical system onto a common optical path using a beam combiner, comprising:
    a first scanning optical system that includes a first scanner and a first pupil projection lens which converts light form the first scanner into a converging light flux;
    a second scanning optical system that includes a second scanner and a second pupil projection lens which converts light from the second scanner into a converging light flux;
    a beam combiner that transmits light received from the first pupil projection lens and that reflects light received from the second pupil projection lens so as to form a common optical path, said beam combiner arranged in a converging or diverging light flux;
    an imaging lens that receives light from the beam combiner;
    a first plane-parallel transparent plate, having an optical thickness equal to the optical thickness of the beam combiner, is located between the second pupil projection lens and the beam combiner and is oriented with its surface normal substantially parallel with the surface normal of the beam combiner;
    an astigmatism-correcting optical element is provided in the common optical path, said astigmatism-correcting optical element generating astigmatism that is equal in magnitude, but different in direction by 90 degrees, to the astigmatism generated by light from the first pupil projection lens being transmitted through said beam combiner;
    wherein
    the beam combiner is located between the first pupil projection lens and the imaging lens, and is oriented at a non-zero angle relative to the direction of the common optical path so as to combine the light from the first scanning optical system and from the second scanning optical system onto the common optical path.

2. The laser combining mechanism according to claim 1, wherein the optical path between said first plane-parallel transparent plate and said beam combiner is linear.

3. The laser combining mechanism according to claim 2, wherein said first plane-parallel transparent plate and said beam combiner are affixed to a support that slides in such a manner that said first plane-parallel transparent plate may be placed between said first pupil projection lens and said imaging lens at a specified non-zero angle.

4. The laser combining mechanism according to claim 2, wherein said first plane-parallel transparent plate and said beam combiner are both affixed to a support that may be rotated.

5. The laser combining mechanism according to claim 4, wherein said first plane-parallel transparent plate and said beam combiner are provided on a filter wheel in opposing positions.

6. The laser combining mechanism according to claim 1, wherein the optical path between said first plane-parallel transparent plate and said beam combiner is folded by a mirror, and said first plane-parallel transparent plate and said beam combiner lie in substantially the same plane.

7. The laser combining mechanism according to claim 6, wherein said first plane-parallel transparent plate and said beam combiner are both affixed to a support that may be rotated.

8. The laser combining mechanism according to claim 7, wherein said first plane-parallel transparent plate and said beam combiner are provided on a filter wheel in opposing positions.

9. The laser combining mechanism according to claim 1, wherein said astigmatism-correcting optical element is a second plane-parallel transparent plate that is located between said beam combiner and said imaging lens on said common optical path, and the following three conditions are satisfied:
    (1) the optical thickness of the second plane-parallel transparent plate equals the optical thickness of the beam combiner;
    (2) the angle between the surface normal of the second plane-parallel transparent plate and the optical axis of the combined beams immediately following the beam combiner is such that it is equal in magnitude to the angle between the surface normal of the beam combiner and the optical axis of the combined beams immediately following the beam combiner; and
    (3) the plane defined by the optical axis of the combined beams immediately following the beam combiner and the surface normal of the second plane-parallel transparent plate is perpendicular to the plane defined by the optical axis of the combined beams and the surface normal of the beam combiner.

10. The laser combining mechanism according to claim 1, wherein said astigmatism-correcting optical element is a mirror having optical power that is provided on the common optical path subsequent to the imaging lens.

11. The laser combining mechanism according to claim 10, wherein said mirror is convex and oriented such that the light reflected by said mirror travels with its optical axis parallel, but in the opposite direction, to the optical axis of the light from said second pupil projection lens.

12. The laser combining mechanism according to claim 10, wherein said mirror is concave and oriented such that the light reflected by said mirror travels in a direction having a direction component that is normal to the plane defined by the optical axis of light from the first pupil projection lens and the optical axis of light from the second pupil projection lens.

13. The laser combining mechanism according to claim 1, wherein said beam combiner and said first plane-parallel transparent plate are affixed to a support that is movable as a unit relative to said common optical path, and
   as the support is moved, a status is switched between
      a first status in which the beam combiner is positioned so as to form a common optical path by transmitting light received from the first pupil projection lens and reflecting light received from the second pupil projection lens, and
      a second status in which the first plane-parallel transparent plate is positioned at a position where the beam combiner is positioned when in the first status.

14. The laser combining mechanism according to claim 13, wherein said beam combiner and said first plane-parallel transparent plate are affixed at separated positions on a first side of said support, and said support may be rotated about an axis midway between said separated positions, with the surface normals of said first plane-parallel transparent plate and of said beam combiner being substantially parallel and at a non-zero angle to the optical axis of light on the common optical path, and the opposite side of said support includes a second plane-parallel transparent plate and a second beam combiner that are identical in structure but switched in position relative to the positions of said first plane-parallel transparent plate and said beam combiner affixed at separated positions on said first side, and with their surface normals substantially perpendicular to the surface normals of said first plane-parallel transparent plate and said beam combiner affixed at separated positions on said first side.

15. A laser scanning microscope comprising the laser combining mechanism according to claim 1.

* * * * *